United States Patent
Hua et al.

(10) Patent No.: US 11,916,823 B2
(45) Date of Patent: Feb. 27, 2024

(54) REFERENCE SIGNAL TRANSMISSION METHOD AND COMMUNICATIONS APPARATUS

(71) Applicant: HUAWEI TECHNOLOGIES CO., LTD., Shenzhen (CN)

(72) Inventors: Meng Hua, Shanghai (CN); Shurong Jiao, Shanghai (CN); Han Zhou, Shanghai (CN); Fei Gao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 17/398,202

(22) Filed: Aug. 10, 2021

(65) Prior Publication Data

US 2021/0367731 A1    Nov. 25, 2021

Related U.S. Application Data

(63) Continuation of application No. PCT/CN2020/074842, filed on Feb. 12, 2020.

(30) Foreign Application Priority Data

Feb. 15, 2019    (CN) .......................... 201910118181.0

(51) Int. Cl.
  *H04L 5/00*    (2006.01)
  *H04W 72/044*    (2023.01)
(52) U.S. Cl.
  CPC .......... *H04L 5/0048* (2013.01); *H04L 5/0094* (2013.01); *H04W 72/044* (2013.01)

(58) Field of Classification Search
  CPC ... H04L 5/0048; H04L 5/0094; H04L 5/0051; H04L 5/0044; H04L 5/0053; H04W 72/044; H04W 72/23
  See application file for complete search history.

(56) References Cited

U.S. PATENT DOCUMENTS

2016/0286404 A1    9/2016    Rico Alvarino et al.
2018/0295650 A1    10/2018    Frenne et al.
(Continued)

FOREIGN PATENT DOCUMENTS

CN    102884751 A    1/2013
CN    107040938 A    8/2017
(Continued)

OTHER PUBLICATIONS

Chinese Notice of Allowance issued in corresponding Chinese Application No. 201910118181.0, dated Jan. 14, 2022, pp. 1-4.
(Continued)

*Primary Examiner* — Chae S Lee
(74) *Attorney, Agent, or Firm* — HAUPTMAN HAM, LLP

(57) ABSTRACT

This application provides a reference signal transmission method, a terminal device, and an access network device. By receiving first indication information from the access network device, the terminal device can determine, based on the first indication information, whether N1 resource blocks that are in a rate matching pattern group and that have an intersection with a time-frequency resource for transmitting a downlink data channel can be used to transmit the downlink data channel, and further determine a position of a reference signal of downlink data channel, to implement reference signal transmission.

15 Claims, 8 Drawing Sheets

(56) References Cited

U.S. PATENT DOCUMENTS

| | | | | |
|---|---|---|---|---|
| 2020/0169956 | A1* | 5/2020 | Sun | ........................ H04W 72/04 |
| 2020/0367242 | A1* | 11/2020 | Moon | ........................ H04L 1/00 |

FOREIGN PATENT DOCUMENTS

| | | | | |
|---|---|---|---|---|
| CN | 107135053 | A | 9/2017 | |
| CN | 108667586 | A | 10/2018 | |
| CN | 108882376 | A | 11/2018 | |
| CN | 109150387 | A | 1/2019 | |
| CN | 109150424 | A | 1/2019 | |
| CN | 109286481 | A | 1/2019 | |
| EP | 3471319 | A1 | 4/2019 | |
| GB | 2576054 | A | 2/2020 | |
| WO | 2018142377 | A1 | 8/2018 | |
| WO | 2018151533 | A1 | 8/2018 | |
| WO | WO-2018142377 | A1 * | 8/2018 | ........... H04L 5/0007 |
| WO | 2018199685 | A1 | 11/2018 | |

OTHER PUBLICATIONS

R1-1719937, LG Electronics, Remaining issues on rate matching resources, 3GPP TSG RAN WG1 Meeting 91, Reno, USA, Nov. 27-Dec. 1, 2017, total 11 pages.

Extended European Search Report issued in corresponding European Application No. 20755556.6, dated Apr. 4, 2022, pp. 1-6.

Kazuaki Takeda, Status Report to TSG, RP-181723, 3GPP TSG RAN meeting #81, Gold Coast, Australia, Sep. 10-13, 2018, 29 pages.

R1-1807351, Qualcomm Incorporated et al., Remaining Details on QCL, 3GPP TSG-RAN WG1 Meeting #93, Busan, Korea, May 21-25, 2018, total 10 pages.

3GPP TS 38.211 V15.4.0 (Dec. 2018), 3rd Generation Partnership Project; Technical Specification Group Radio Access Network; NR;Physical channels and modulation(Release 15), total 96 pages.

Satoshi Nagata, 3GPP RAN WG1 Chairman, Status Report for RAN WG1 to TSG-RAN #76, RP-170858, 3GPP TSG RAN #76, Florida, USA, Jun. 5-8, 2017, 35 pages.

R1-1813974, Ericsson, Summary of 7.1.6 (Maintenance for URLLC), 3GPP TSG-RAN WG1 Meeting #95, Spokane, USA, Nov. 12-16, 2018, total 6 pages.

3GPP TS 38.212 V15.4.0 (Dec. 2018), 3rd Generation Partnership Project; Technical Specification Group Radio Access Network; NR; Multiplexing and channel coding (Release 15), total 100 pages.

NTT DOCOMO et al., CSI RS Configuration to Support 4 Tx MIMO UE in 8 Tx Networks, R1-110861, 3GPP TSG RAN WG1 Meeting #64, Taipei, Taiwan, Feb. 21-25, 2011, 5 pages.

3GPP TS 38.214 V15.4.0 (Dec. 2018), 3rd Generation Partnership Project; Technical Specification Group Radio Access Network; NR; Physical layer procedures for data (Release 15), total 102 pages.

3GPP TS 38.306 V15.4.0 (Dec. 2018), 3rd Generation Partnership Project; Technical Specification Group Radio Access Network; NR; User Equipment (UE) radio access capabilities (Release 15), total 40 pages.

International Search Report issued in corresponding International Application No. PCT/CN2020/074842, dated May 9, 2020, pp. 1-9.

Chinese Office Action issued in corresponding Chinese Application No. 201910118181.0, dated Apr. 30, 2021, pp. 1-5.

Chinese Search Report issued in corresponding Chinese Application No. 201910118181.0, dated Apr. 20, 2021, pp. 1-3.

* cited by examiner

REFERENCE SIGNAL TRANSMISSION METHOD AND COMMUNICATIONS APPARATUS

CROSS-REFERENCE TO RELATED APPLICATIONS

This application is a continuation of International Application No. PCT/CN2020/074842, filed on Feb. 12, 2020, which claims priority to Chinese Patent Application No. 201910118181.0, filed on Feb. 15, 2019. The disclosures of the aforementioned applications are hereby incorporated by reference in their entireties.

TECHNICAL FIELD

This application relates to the field of communications technologies, and more specifically, to a reference signal transmission method and a communications apparatus.

BACKGROUND

In a current communications protocol, transmission of a reference signal should avoid a configured time-frequency resource used to transmit a downlink control channel. When a time-frequency resource of the reference signal conflicts with a time-frequency resource of a configured control resource set (CORESTE), the transmission of the reference signal needs to be delayed. This affects sending of the reference signal.

For example, in some scenarios, when the configured control resource set has a relatively large quantity of time-frequency resources, a probability of a conflict between the time-frequency resource of the reference signal and the time-frequency resource of the configured control resource set increases, and the reference signal needs to avoid all time-frequency resources that conflict with the reference signal to implement reference signal transmission. This affects normal transmission of the reference signal, and even causes a sending failure of the reference signal. Therefore, how to better transmit the reference signal is a problem that needs to be resolved.

SUMMARY

This application provides a reference signal transmission method, a terminal device, and an access network device, to determine a position of a reference signal of a data channel, and further receive the reference signal.

According to a first aspect, a reference signal receiving method is provided. The method includes: receiving time-frequency resource configuration information of a downlink control channel from an access network device; receiving time-frequency resource configuration information of a downlink data channel from the access network device; receiving first indication information from the access network device; determining, based on a second time-frequency resource, N resource blocks, and the first indication information, a position of a reference signal of the downlink data channel in the second time-frequency resource; and receiving the reference signal.

The time-frequency resource configuration information of the downlink control channel indicates a first time-frequency resource, the first time-frequency resource is a time-frequency resource used to transmit the downlink control channel, the first time-frequency resource includes M resource blocks, M is a positive integer, and M may be an infinite positive integer.

The time-frequency resource configuration information of the downlink data channel indicates the second time-frequency resource, the second time-frequency resource is a time-frequency resource used to transmit the downlink data channel, an intersection exists between the second time-frequency resource and the N resource blocks in the M resource blocks, and N is a positive integer less than M.

The first indication information indicates whether N1 resource blocks in the N resource blocks can be used to transmit the downlink data channel, the N1 resource blocks are resource blocks in a rate matching pattern group in the N resource blocks, and N1 is a positive integer.

Optionally, the reference signal is a demodulation reference signal DMRS).

Optionally, the resource blocks are resources corresponding to a control resource set (CORESET).

Optionally, the receiving the reference signal includes: receiving the reference signal based on the determined position of the reference signal.

After the position of the reference signal is determined, the reference signal from the access network device may be detected at the position of the reference signal.

In this application, when the first time-frequency resource includes the N resource blocks that have the intersection with the second time-frequency resource, the position of the reference signal of the downlink data channel may be determined based on whether the N1 resource blocks in the rate matching pattern group in the N resource blocks can be used to transmit the downlink data channel, to implement reference signal transmission.

Optionally, the time-frequency resource configuration information of the downlink control channel may specifically include control resource set information (ControlResourceSet or ControlResourceSetZero) and search space information (SearchSpace or SearchSpaceZero).

The control resource set information is used to determine a size of a time domain resource and a size of a frequency domain resource that are of a resource block of the first time-frequency resource, and the search space information is used to determine a position of a time domain resource of the resource block of the first time-frequency resource.

Optionally, the time-frequency resource configuration information of the downlink data channel is carried in downlink control information (DCI) received by a terminal device from the access network device.

Specifically, the time-frequency resource configuration information of the downlink data channel may be frequency domain resource allocation information (frequency domain resource assignment) and time domain resource allocation information (time domain resource assignment) that are carried in the DCI.

The frequency domain resource allocation information indicates a frequency domain resource of the second time-frequency resource, and the time domain resource allocation information indicates a time domain resource of the second time-frequency resource.

Optionally, the first indication information is carried in the downlink control information DCI received by the terminal device from the access network device.

Specifically, the first indication information may be rate matching indication information (rate matching indicator) carried in the DCI.

With reference to the first aspect, in some implementations of the first aspect, the determining, by the terminal device based on a second time-frequency resource, N resource blocks, and the first indication information, a position of a reference signal of the downlink data channel in the second time-frequency resource includes: determining, based on whether the N1 resource blocks can be used to transmit the downlink data channel, that a time domain position of the first reference signal of the downlink data channel is located on an $i^{th}$ symbol of the second time-frequency resource, where i is a positive integer.

The $i^{th}$ symbol is a symbol with a smallest sequence number in the first-type symbol and/or the second-type symbol.

The first-type symbol is a symbol in the second time-frequency resource, all P resource blocks that are in the N1 resource blocks and that have an intersection, in the second time-frequency resource, with the first-type symbol may be used to transmit the downlink data channel, there is no intersection, in the second time-frequency resource, between the first-type symbol and any one of N2 resource blocks, P is a positive integer less than or equal to N1, and the N2 resource blocks are resource blocks other than the N1 resource blocks in the N resource blocks.

It should be understood that when only the first-type symbol exists in the second time-frequency resource, the $i^{th}$ symbol is a symbol with a smallest sequence number in the first-type symbol; when only the second-type symbol exists in the second time-frequency resource, the $i^{th}$ symbol is a symbol with a smallest sequence number in the second-type symbol; or when both the first-type symbol and the second-type symbol exist in the second time-frequency resource, the $i^{th}$ symbol is a symbol with a smallest sequence number in the first-type symbol and the second-type symbol.

For example, if the second time-frequency resource includes the first to the eighth symbols, where the first symbol is the second-type symbol, and the second symbol to the fourth symbol are first-type symbols, the first symbol in the second time-frequency resource is the $i^{th}$ symbol, and i=1.

For another example, if the second time-frequency resource includes the first to the eighth symbols, where the second to the fourth symbols are first-type symbols, and the seventh symbol and the eighth symbol are second-type symbols, the second symbol in the second time-frequency resource is the $i^{th}$ symbol, and i=2.

Optionally, the determining, based on whether the N1 resource blocks can be used to transmit the downlink data channel, that a time domain position of the first reference signal of the downlink data channel is located on an $i^{th}$ symbol of the second time-frequency resource includes: sequentially traversing first $i^{th}$ symbols of the second time-frequency resource until the $i^{th}$ symbol is determined.

Specifically, when determining the $i^{th}$ symbol, the first symbol, the second symbol, and so on that are of the second time-frequency resource may be sequentially traversed until the $i^{th}$ symbol that meets a condition is found.

It should be understood that 1 may alternatively be an integer greater than or equal to 0. In other words, symbols in this application may be counted starting from 1 (the smallest sequence number is 1), or may be counted starting from 0 (the smallest sequence number is 0).

It should be understood that a minimum value of i herein may be 0 or 1.

When the minimum value of i is 0, traversing may start from the 0th symbol in the second time-frequency resource until the $i^{th}$ symbol that meets the condition is determined.

With reference to the first aspect, in some implementations of the first aspect, time domain resources of the downlink data channel are a subset of time domain resources of the downlink control channel for scheduling the downlink data channel.

It should be understood that, that the time domain resources of the downlink data channel are the subset of the time domain resources for scheduling the downlink data channel includes two cases: a size of the time domain resources of the downlink data channel is smaller than a size of the time domain resources for scheduling the downlink data channel; and the size of the time domain resources of the downlink data channel is the same as the size of the time domain resources for scheduling the downlink data channel.

With reference to the first aspect, in some implementations of the first aspect, none of the P resource blocks carries the downlink control channel for scheduling the downlink data channel, and time domain resources of the downlink data channel are not a subset of time domain resources of the downlink control channel for scheduling the downlink data channel.

It should be understood that when at least a part of the time domain resources of the downlink data channel does not belong to the time domain resources of the downlink control channel for scheduling the downlink data channel, the time domain resources of the downlink data channel are not the subset of the time domain resources of the downlink control channel for scheduling the downlink data channel.

With reference to the first aspect, in some implementations of the first aspect, the method further includes: determining that a mapping type of the downlink data channel is a type B.

According to a second aspect, a reference signal sending method is provided. The method includes: sending time-frequency resource configuration information of a downlink control channel to a terminal device; sending time-frequency resource configuration information of a downlink data channel to the terminal device; sending first indication information to the terminal device; and sending a reference signal of the downlink data channel to the terminal device, where a position of the reference signal on a second time-frequency resource is determined based on the second time-frequency resource, N resource blocks, and whether N1 resource blocks can be used to transmit the downlink data channel.

The time-frequency resource configuration information of the downlink control channel indicates a first time-frequency resource, the first time-frequency resource is a time-frequency resource used to transmit the downlink control channel, the first time-frequency resource includes M resource blocks, M is a positive integer, and M may be an infinite positive integer.

The time-frequency resource configuration information of the downlink data channel indicates the second time-frequency resource, the second time-frequency resource is a time-frequency resource used to transmit the downlink data channel, an intersection exists between the second time-frequency resource and the N resource blocks in the M resource blocks, and N is a positive integer less than M.

The first indication information indicates whether N1 resource blocks in the N resource blocks can be used to transmit the downlink data channel, the N1 resource blocks are resource blocks in a rate matching pattern group in the N resource blocks, and N1 is a positive integer.

In this application, when the first time-frequency resource includes the N resource blocks that have the intersection with the second time-frequency resource, the indication information may be sent to the terminal device to indicate whether the N1 resource blocks in the rate matching pattern group in the N resource blocks can be used to transmit the downlink data channel, so that the terminal device can determine the position of the reference signal of the downlink data channel based on the indication information, to implement reference signal transmission.

Optionally, the reference signal is a demodulation reference signal DMRS.

Optionally, the resource blocks are resources corresponding to a control resource set (CORESET).

With reference to the second aspect, in some implementations of the second aspect, a time domain position of the first reference signal of the downlink data channel is located on an $i^{th}$ symbol of the second time-frequency resource.

The $i^{th}$ symbol is a symbol with a smallest sequence number in the first-type symbol and/or the second-type symbol.

The first-type symbol is a symbol in the second time-frequency resource, all P resource blocks that are in the N1 resource blocks and that have an intersection, in the second time-frequency resource, with the first-type symbol may be used to transmit the downlink data channel, there is no intersection, in the second time-frequency resource, between the first-type symbol and any one of N2 resource blocks, P is a positive integer less than or equal to N1, and the N2 resource blocks are resource blocks other than the N1 resource blocks in the N resource blocks.

With reference to the second aspect, in some implementations of the second aspect, time domain resources of the downlink data channel are a subset of time domain resources of the downlink control channel for scheduling the downlink data channel.

With reference to the second aspect, in some implementations of the second aspect, none of the P resource blocks carries the downlink control channel for scheduling the downlink data channel, and time domain resources of the downlink data channel are not a subset of time domain resources of the downlink control channel for scheduling the downlink data channel.

With reference to the second aspect, in some implementations of the second aspect, a mapping type of the downlink data channel is a type B.

According to a third aspect, a reference signal receiving method is provided. The method includes: receiving time-frequency resource configuration information of a downlink control channel from an access network device; receiving time-frequency resource configuration information of a downlink data channel from the access network device; receiving second indication information from the access network device; and receiving a reference signal based on the second indication information.

The time-frequency resource configuration information of the downlink control channel indicates a first time-frequency resource, the first time-frequency resource is a time-frequency resource used to transmit the downlink control channel, the first time-frequency resource includes M resource blocks, M is a positive integer, and M may be an infinite positive integer.

The time-frequency resource configuration information of the downlink data channel indicates a second time-frequency resource, the second time-frequency resource is a time-frequency resource used to transmit the downlink data channel, an intersection exists between the second time-frequency resource and N resource blocks in the M resource blocks, and N is a positive integer less than M.

The second indication information is used to indicate a time domain position of the reference signal of the downlink data channel in the second time-frequency resource, where all Q resource blocks that are in the N resource blocks and that have an intersection with a time domain resource of the reference signal of the downlink data channel can be used to transmit the downlink data channel.

Optionally, the second indication information is reference signal indication information.

Rate matching information may be carried in DCI sent by the access network device to a terminal device.

In this application, the time domain position of the reference signal in the second time-frequency resource can be indicated by reusing the rate matching information, so that bits required to indicate the time domain position of the reference signal can be saved.

With reference to the third aspect, in some implementations of the third aspect, a value of a bit of the second indication information indicates a position of the first reference signal of the downlink data channel in the second time-frequency resource.

With reference to the third aspect, in some implementations of the third aspect, the value of the bit of the second indication information further indicates whether a resource block carrying the downlink control channel for scheduling the downlink data channel can be used to transmit the downlink data channel.

With reference to the third aspect, in some implementations of the third aspect, the method further includes: determining that a mapping type of the downlink data channel is a type B.

According to a fourth aspect, a reference signal receiving method is provided. The method includes: sending time-frequency resource configuration information of a downlink control channel to a terminal device, where the time-frequency resource configuration information of the downlink control channel indicates a first time-frequency resource, the first time-frequency resource is a time-frequency resource used to transmit the downlink control channel, the first time-frequency resource includes M resource blocks, M is a positive integer, and M may be an infinite positive integer; sending time-frequency resource configuration information of a downlink data channel to the terminal device, where the time-frequency resource configuration information of the downlink data channel indicates a second time-frequency resource, the second time-frequency resource is a time-frequency resource used to transmit the downlink data channel, an intersection exists between the second time-frequency resource and N resource blocks in the M resource blocks, and N is a positive integer less than M; sending a reference signal of the downlink data channel to the terminal device; and sending second indication information to the terminal device, where the second indication information is used to indicate a time domain position of the reference signal of the downlink data channel in the second time-frequency resource, and all Q resource blocks that are in the N resource blocks and that have an intersection with a time domain resource of the reference signal of the downlink data channel can be used to transmit the downlink data channel.

Optionally, the second indication information is rate matching information.

When the second indication information is the rate matching information, and the rate matching information has not only a function of indicating rate matching, but also a function of indicating the position of the reference signal, bit overheads can be reduced by reusing the existing rate matching information.

The rate matching information may be carried in DCI sent by an access network device to the terminal device.

In this application, the time domain position of the reference signal in the second time-frequency resource can be indicated by reusing the rate matching information, so that bits required to indicate the time domain position of the reference signal can be saved.

With reference to the fourth aspect, in some implementations of the fourth aspect, a value of a bit of the second indication information indicates a position of the first reference signal of the downlink data channel in the second time-frequency resource.

With reference to the fourth aspect, in some implementations of the fourth aspect, the value of the bit of the second indication information further indicates whether a resource block carrying the downlink control channel for scheduling the downlink data channel can be used to transmit the downlink data channel.

With reference to the fourth aspect, in some implementations of the fourth aspect, the downlink data channel is of a B mapping type.

According to a fifth aspect, a terminal device is provided. The terminal device includes a corresponding module configured to perform the method/operation/step/action described in the first aspect or the third aspect. The module may be a hardware circuit, or may be software, or may be implemented by a hardware circuit in combination with software.

According to a sixth aspect, an access network device is provided. The access network device includes a corresponding module configured to perform the method/operation/step/action described in the second aspect or the fourth aspect. The module may be a hardware circuit, or may be software, or may be implemented by a hardware circuit in combination with software.

According to a seventh aspect, a terminal device is provided. The terminal device includes a processor and a transceiver, and may further include a memory. The processor is configured to invoke program code stored in the memory, to perform some or all operations in any one of the manners of the first aspect or the third aspect.

Specifically, when the processor invokes the program code stored in the memory, the transceiver and the processor are configured to perform the some or all operations in any one of the manners of the first aspect or the third aspect.

Optionally, the memory is a non-volatile memory.

Optionally, the memory and the processor are coupled to each other.

According to an eighth aspect, an access network device is provided. The access network device includes a processor and a transceiver, and may further include a memory. The processor is configured to invoke program code stored in the memory, to perform some or all operations in any one of the manners of the second aspect or the fourth aspect.

Specifically, when the processor invokes the program code stored in the memory, the transceiver and the processor are configured to perform the some or all operations in any one of the manners of the second aspect or the fourth aspect.

Optionally, the memory is a non-volatile memory.

Optionally, the memory and the processor are coupled to each other.

According to a ninth aspect, an embodiment of this application provides a computer-readable storage medium. The computer-readable storage medium stores program code. The program code includes instructions used to perform some or all of the steps of the method according to the first aspect, the second aspect, the third aspect, or the fourth aspect.

Optionally, the computer-readable storage medium is located in an access network device or a terminal device.

According to a tenth aspect, an embodiment of this application provides a computer program product. When the computer program product runs on a computer, the computer is enabled to perform some or all of the steps of the method according to the first aspect, the second aspect, the third aspect, or the fourth aspect.

According to an eleventh aspect, a chip is provided. The chip includes a processor, and the processor is configured to perform some or all operations in any one of the manners of the first aspect, the second aspect, the third aspect, or the fourth aspect.

Optionally, the chip is located in an access network device or a terminal device.

DESCRIPTION OF EMBODIMENTS

Figure 1:
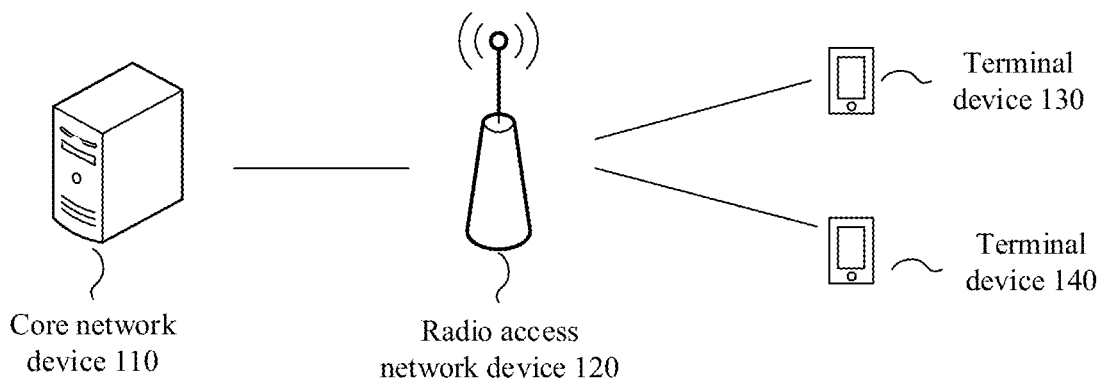
FIG. 1 is a schematic diagram of a scenario to which an embodiment of this application may be applied.

The following describes technical solutions of this application with reference to accompanying drawings.

The technical solutions in the embodiments of this application may be applied to various communications systems, for example, a long term evolution (LTE) system, a new radio (NR) system in a 5th generation (5G) mobile communications system, or a future mobile communications system.

A terminal device in the embodiments of this application may also be referred to as a terminal Terminal, user equipment (UE), a mobile station (MS), a mobile terminal (MT), and the like. The terminal device may be a mobile phone, a tablet computer (Pad), a computer having a wireless transceiver function, a virtual reality (Virtual Reality, VR) terminal device, an augmented reality (AR) terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form used by the terminal device are not limited in the embodiments of this application.

An access network device in the embodiments of this application is an access device through which the terminal device accesses the mobile communications system in a wireless manner, and may be a NodeB, an evolved NodeB (eNodeB), a transmission reception point (TRP), a next generation NodeB (gNB) in a 5G mobile communications system, a base station in a future mobile communications system, an access node or a relay station in a Wi-Fi system, or the like; or may be a module or a unit that completes some functions of a base station, for example, may be a central unit (CU), or may be a distributed unit (DU). A specific technology and a specific device form used by the radio access network device are not limited in the embodiments of this application.

In the embodiments of this application, the terminal device or the access network device may include a hardware layer, an operating system layer running on the hardware layer, and an application layer running on the operating system layer. The hardware layer may include hardware such as a central processing unit (CPU), a memory management unit (MMU), and a memory (which is also referred to as a main memory). The operating system may be any one or more computer operating systems, for example, a Linux operating system, a Unix operating system, an Android operating system, an iOS operating system, or a Windows operating system, that implement service processing by using a process (process). The application layer may include applications such as a browser, an address book, word processing software, and instant messaging software. In addition, a specific structure of an execution body of a method provided in the embodiments of this application is not specifically limited in the embodiments of this application, provided that a corresponding program that records the method provided in the embodiments of this application can be run to perform communication based on the method provided in the embodiments of this application. For example, the method provided in the embodiments of this application may be performed by the terminal device, the access network device, or a function module that is in the terminal device or the access network device, for example, a chip.

Various storage media described in this specification may indicate one or more devices and/or other machine-readable media that are configured to store information. The term "computer-readable storage medium" may include but is not limited to a radio channel, and various other media that can store, contain, and/or carry instructions and/or data.

To better understand the embodiments of this application, the following first briefly describes a possible application scenario of the embodiments of this application with reference to FIG. 1.

FIG. 1 is a schematic diagram of a scenario to which an embodiment of this application may be applied.

FIG. 1 is a schematic architectural diagram of a mobile communications system to which an embodiment of this application is applicable. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different physical devices independent of each other, or functions of the core network device and logical functions of the radio access network device may be integrated into a same physical device, or some functions of the core network device and some functions of the radio access network device may be integrated into one physical device. The terminal device may be at a fixed position or may be mobile. FIG. 1 is only a schematic diagram. The communications system may further include another network device, for example, may further include a wireless relay device and a wireless backhaul device, which are not shown in FIG. 1. Quantities of core network devices, radio access network devices, and terminal devices included in the mobile communications system are not limited in this embodiment of this application. The access network device in FIG. 1 may send a physical downlink control channel (PDCCH) to the terminal device, and further send a physical downlink shared channel (PDSCH) to the terminal device.

In NR, one PDCCH may include L={1, 2, 4, 8, 16} control channel elements (CCE). Herein, L is referred to as an aggregation level (AL) of the PDCCH.

One CCE includes six resource element groups (REG), and each REG corresponds to one resource block (RB) on one orthogonal frequency division multiplexing (OFDM) symbol.

One PDCCH candidate may include L={1, 2, 4, 8, 16} CCEs, and one PDCCH candidate may or may not send a PDCCH of one UE. The UE may detect a PDCCH candidate, to determine whether there is a PDCCH sent to the UE.

A search space whose AL is L may be defined as a set of PDCCH candidates whose ALs are L. A search space set (SearchSpaceSet) is a set of different ALs. One SearchSpaceSet corresponds to one control resource set (CORESET).

It should be understood that the communications system shown in FIG. 1 shows only one access network device and one terminal device. Actually, this embodiment of this application may be further applied to a scenario in which a plurality of terminal devices are included, where each terminal device may independently perform a reference signal receiving method according to an embodiment of this application.

In this application, a downlink control channel may be a control channel used to schedule a downlink data channel, the downlink control channel may be specifically a PDCCH, and the downlink data channel may be specifically a PDSCH.

Figure 2:
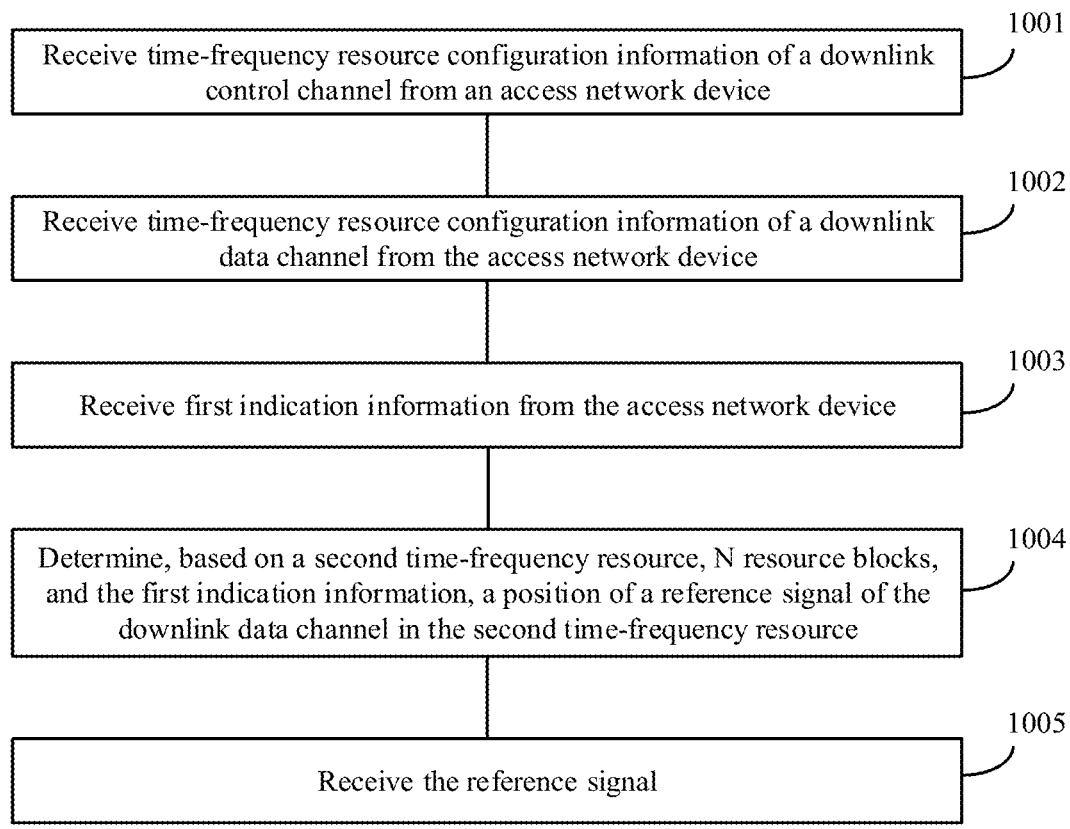
FIG. 2 is a schematic flowchart of a reference signal receiving method according to an embodiment of this application.

The following describes a reference signal receiving method in the embodiments of this application in detail with reference to FIG. 2.

FIG. 2 is a schematic flowchart of a reference signal receiving method according to an embodiment of this application. The method shown in FIG. 2 may be performed by a terminal device. The method shown in FIG. 2 includes steps 1001 to 1005, and the following describes these steps in detail.

1001: Receive time-frequency resource configuration information of a downlink control channel from an access network device.

The time-frequency resource configuration information of the downlink control channel indicates a first time-frequency resource, the first time-frequency resource is a time-frequency resource used to transmit the downlink control channel, the first time-frequency resource includes M resource blocks, M is a positive integer, and M may be an infinite positive integer.

A size of each resource block is determined based on a frequency domain parameter and a time interval that are of a CORESET.

A CORESET is a concept introduced in an NR system. A parameter of a CORESET whose ID is controlResourceSetId may be configured in an RRC information element ControlResourceSet or ControlResourceSetZero (when the parameter is configured by using ControlResourceSetZero, controlResourceSetId=0).

When a CORESET is configured by using ControlResourceSet/ControlResourceSetZero, parameters of the CORESET may be shown in Table 1.

TABLE 1

| CORESET parameter | Configured by using ControlResourceSet | Configured by using ControlResourceSetZero |
|---|---|---|
| Frequency domain parameter | frequencyDomainResources: indicating a frequency domain resource of the CORESET, which includes a group of contiguous or non-contiguous frequency domain units. Each resource unit is 6 RBs. A maximum of 270 RBs can be included. | Number of RBs: 24, 48, or 96 contiguous RBs may be included. |
| Time domain interval parameter | Duration: indicating duration of the CORESET in time domain. One, two, or three OFDM symbols may be included. | Number of Symbols: One, two, or three OFDM symbols may be included. |

As shown in Table 1, the control resource set (ControlResourceSet) is an information element (information element, IE), and includes a plurality of parameters. The control resource set 0 (ControlResourceSetZero) is used to configure a parameter of a CORESET whose ID is 0 in CORESETs. A size of a time-frequency resource block of the CORESET may be determined based on the frequency domain parameter and the time domain interval parameter that are of the CORESET shown in Table 1.

Figure 3:
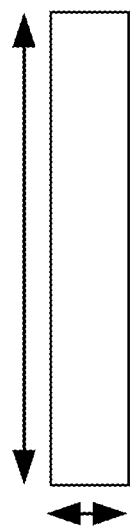
FIG. 3 is a schematic diagram of a resource block.

For a resource block shown in FIG. 3, a frequency domain position of the resource block may be determined based on a frequency domain parameter (frequency domain resource of a CORESET configured by ControlResourceSet or ControlResourceSetZero), and a time domain interval of the resource block may be determined based on a time domain parameter (CORESET duration configured by ControlResourceSet or ControlResourceSetZero).

Figure 4:
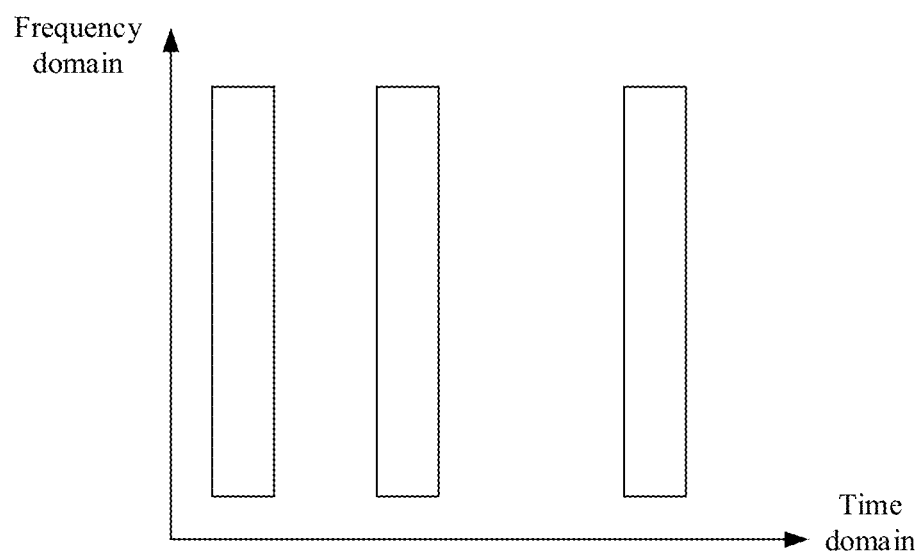
FIG. 4 is a schematic diagram of distribution positions of resource blocks in time domain and frequency domain.

The time-frequency resource shown in FIG. 3 may be referred to as a CORESET resource block. The CORESET resource block may appear at a plurality of positions in time, and a PDCCH may be sent at any position. Therefore, the terminal device further needs to know a position (as shown in FIG. 4) at which the CORESET resource block appears in time domain, to perform PDCCH detection. The information is provided during SearchSpaceSet configuration.

One SearchSpaceSet may correspond to only one CORESET, and one CORESET may correspond to a plurality of SearchSpaceSets.

A SearchSpaceSet may be configured by using an RRC information element SearchSpace or SearchSpaceZero.

When the SearchSpaceSet is configured by using SearchSpace, the SearchSpaceSet includes the following parameters:

1. monitoringSlotPeriodicityAndOffset: a periodicity and a start slot offset in a unit of a slot;
2. duration: a quantity of contiguous slots in a periodicity;
3. monitoringSymbolsWithinSlot: A start symbol indicated by a bitmap in each slot (there may be a plurality of start symbols in one slot);

When the SearchSpaceSet is configured by using SearchSpaceZero, this IE can include time domain information of a SearchSpaceSet 0.

Optionally, the time-frequency resource configuration information of the downlink control channel in step 1001 includes control resource set information (ControlResourceSet or ControlResourceSetZero) and search space information (SearchSpace or SearchSpaceZero).

The control resource set information is used to determine a size of a time domain resource and a position of a frequency domain resource that are of the resource block of the first time-frequency resource, and the search space information is used to determine a position of the time domain resource of the resource block of the first time-frequency resource.

1002: Receive time-frequency resource configuration information of a downlink data channel from the access network device.

The time-frequency resource configuration information of the downlink data channel indicates a second time-frequency resource, the second time-frequency resource is a time-frequency resource used to transmit the downlink data channel, an intersection exists between the second time-frequency resource and N resource blocks in the M resource blocks, and N is a positive integer less than M.

Specifically, the time-frequency resource configuration information of the downlink data channel may specifically include two parts: frequency domain resource allocation information (frequency domain resource assignment) and time domain resource allocation information (time domain resource assignment). The frequency domain resource allocation information and the time domain resource allocation information may be carried in DCI sent by the access network device.

The second time-frequency resource may be specifically a time-frequency resource of a PDSCH configured for the terminal device.

That an intersection exists between the second time-frequency resource and N resource blocks may specifically mean that an intersection exists between the second time-frequency resource and each of the N resource blocks.

The N resource blocks may include a resource block that is not a subset of the second time-frequency resource, or may include a resource block that is a subset of the second time-frequency resource.

It is assumed that a first resource block is one of the N resource blocks. The following describes a relationship between the first resource block and the second time-frequency resource with reference to FIG. 5 and FIG. 6.

Figure 5:
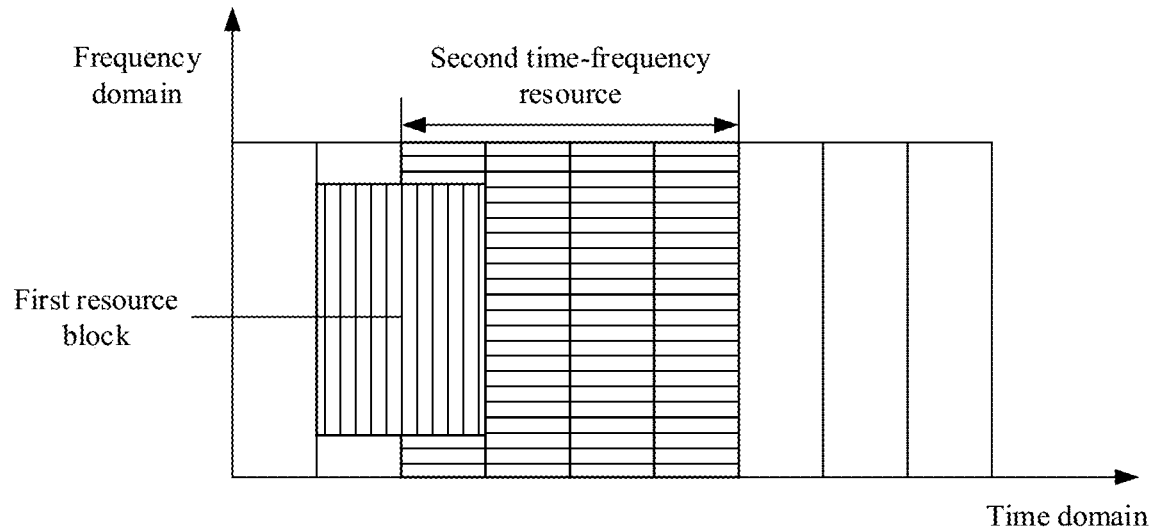
FIG. 5 is a schematic diagram of an intersection between a second time-frequency resource and a first resource block.

As shown in FIG. 5, the first resource block includes two resource parts, where one part is located inside the second time-frequency resource, and the other part is located outside the second time-frequency resource. To be specific, in FIG. 5, the first resource block and the second time-frequency resource have an intersection, but the first resource block is not a subset of the second time-frequency resource.

Figure 6:
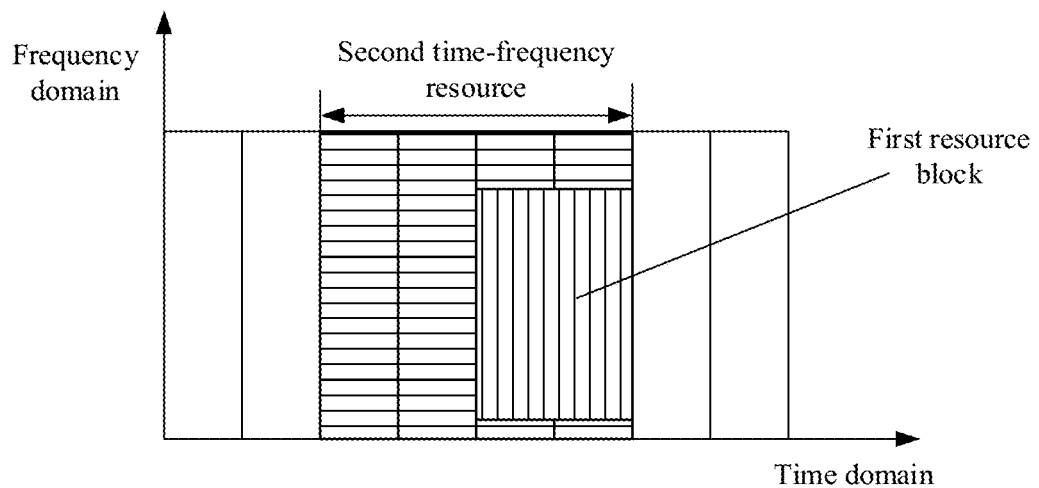
FIG. 6 is a schematic diagram of an intersection between a second time-frequency resource and a first resource block.

As shown in FIG. 6, the first resource block is completely included in the second time-frequency resource, and the first resource block is a subset of the second time-frequency resource.

Optionally, the time-frequency resource configuration information of the downlink data channel in step 1002 is carried in the downlink control information DCI received by the terminal device from the access network device.

Specifically, the time-frequency resource configuration information of the downlink data channel may be the frequency domain resource allocation information (frequency domain resource assignment) and the time domain resource allocation information (time domain resource assignment) that are carried in the DCI.

The frequency domain resource allocation information indicates a frequency domain resource of the second time-frequency resource, and the time domain resource allocation information indicates a time domain resource of the second time-frequency resource.

1003: Receive first indication information from the access network device.

The first indication information indicates whether N1 resource blocks in the N resource blocks can be used to transmit the downlink data channel, the N1 resource blocks are resource blocks in a rate matching pattern group in the N resource blocks, and N1 is a positive integer.

Because the N1 resource blocks are the resource blocks located in the rate matching pattern group, some or all of the N1 resource blocks can be used to transmit the downlink data channel. Whether each resource block can be used to transmit the downlink data channel may be determined based on the first indication information.

The resource blocks may be specifically resources corresponding to a control resource set (CORESET).

Optionally, the first indication information is rate matching indication information (rate matching indicator).

The rate matching indication information may be carried in the DCI sent by the access network device.

Specifically, the first indication information may indicate whether each of the N1 resource blocks can be used to transmit the downlink data channel.

Optionally, the first indication information is carried in the downlink control information DCI received by the terminal device from the access network device.

Specifically, the first indication information may be rate matching indication information (rate matching indicator) carried in the DCI.

Optionally, a value of a bit of the first indication information is used to indicate whether the N1 resource blocks can be used to transmit the downlink data channel.

For example, the N1 resource blocks may belong to groups 1 to K, K is a positive integer, and a value of K may be preset in a protocol. For each group of resource blocks, a value of one bit of the first indication information may be used to indicate whether the group of resource blocks can be used to transmit the downlink data channel (In this case, all of resource blocks in a group can be used to transmit the downlink data channel, or none of the resource blocks in the group can be used to transmit the downlink data channel).

Optionally, when a value of a bit that is in the first indication information and that corresponds to a group of resource blocks is 0, it indicates that all the resource blocks in the group can be used to transmit the downlink data channel. When the value of the bit that is in the first indication information and that corresponds to the group of resource blocks is 1, it indicates that none of the resource blocks in the group can be used to transmit the downlink data channel. It should be understood that, in this application, another value of the bit of the first indication information may alternatively be used to indicate whether a resource block in a group of resource blocks can be used to transmit the downlink data channel.

1004: Determine, based on the second time-frequency resource, the N resource blocks, and the first indication information, a position of a reference signal of the downlink data channel in the second time-frequency resource.

In step 1004, if a resource block in the N1 resource blocks indicated by the first indication information can be used to transmit the downlink data channel, the resource block can be used to transmit the reference signal.

Optionally, determining, based on the second time-frequency resource, the N resource blocks, and the first indication information, the position of the reference signal of the downlink data channel in the second time-frequency resource includes: determining, based on whether the N1 resource blocks can be used to transmit the downlink data channel, that a time domain position of the first reference signal of the downlink data channel is located on an $i^{th}$ symbol of the second time-frequency resource, where i is a positive integer.

The $i^{th}$ symbol is a symbol with a smallest sequence number in the first-type symbol and/or the second-type symbol.

The first-type symbol is a symbol in the second time-frequency resource, all P resource blocks that are in the N1 resource blocks and that have an intersection, in the second time-frequency resource, with the first-type symbol may be used to transmit the downlink data channel, there is no intersection, in the second time-frequency resource, between the first-type symbol and any one of N2 resource blocks, P is a positive integer less than or equal to N1, and the N2 resource blocks are resource blocks other than the N1 resource blocks in the N resource blocks.

It should be understood that when only the first-type symbol exists in the second time-frequency resource, the $i^{th}$ symbol is a symbol with a smallest sequence number in the first-type symbol; when only the second-type symbol exists in the second time-frequency resource, the $i^{th}$ symbol is a symbol with a smallest sequence number in the second-type symbol; or when both the first-type symbol and the second-type symbol exist in the second time-frequency resource, the $i^{th}$ symbol is a symbol with a smallest sequence number in the first-type symbol and the second-type symbol.

For example, if the second time-frequency resource includes the first to the eighth symbols, where the first symbol is the second-type symbol, and the second symbol to the fourth symbol are first-type symbols, the first symbol in the second time-frequency resource is the $i^{th}$ symbol, and i=1.

For another example, if the second time-frequency resource includes the first to the eighth symbols, where the second to the fourth symbols are first-type symbols, and the seventh symbol and the eighth symbol are second-type symbols, the second symbol in the second time-frequency resource is the $i^{th}$ symbol, and i=2.

The following describes a position of the $i^{th}$ symbol with reference to FIG. 5 and FIG. 6.

For example, as shown in FIG. 5, the second time-frequency resource is a shaded area marked with horizontal lines in FIG. 5, the first resource block is a shaded area marked with vertical lines in FIG. 5, and an intersection exists between the first resource block and the first symbol in the second time-frequency resource. The first resource block is a resource block in the N1 resource blocks. If only the first resource block in the N resource blocks has an intersection with the first symbol of the second time-frequency resource, and the first resource block can be used to transmit the downlink data channel (in this case, the first symbol in the second time-frequency resource belongs to the foregoing first-type symbol), the first (in this case, i=1) symbol in the second time-frequency resource may be determined as the time domain position of the first reference signal of the downlink data channel.

For another example, as shown in FIG. 6, there is no intersection between the first symbol in the second time-frequency resource and the N resource blocks. In this case, the first symbol in the second time-frequency resource belongs to the foregoing second-type symbol. Therefore, the first (in this case, i=1) symbol in the second time-frequency resource may be directly determined as the time domain position of the first reference signal of the downlink data channel.

Figure 7:
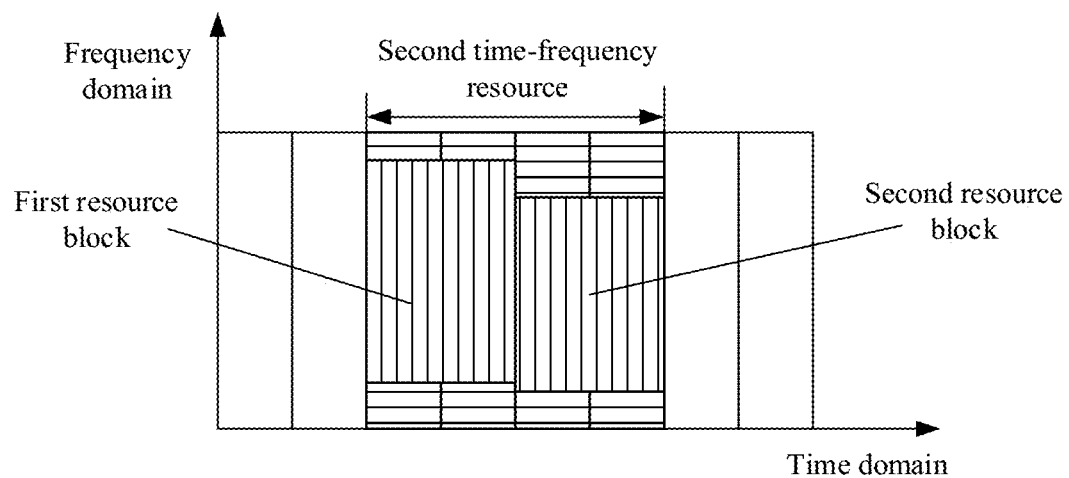
FIG. 7 is a schematic diagram of intersections between a second time-frequency resource and a first resource block and between the second time-frequency resource and a second resource block.

For another example, as shown in FIG. 7, the first symbol and the second symbol that are in the second time-frequency resource have an intersection, in the second time-frequency resource, with the first resource block in the N resource blocks. The third symbol and the fourth symbol that are in the second time-frequency resource have an intersection, in the second time-frequency resource, with a second resource block in the N resource blocks. The first resource block cannot be used to transmit the downlink data channel, and the second resource block can be used to transmit the downlink data channel. Therefore, the third (in this case, i=3) symbol in the second time-frequency resource may be determined as the time domain position of the first reference signal of the downlink data channel.

Optionally, in an embodiment, time domain resources of the second time-frequency resource are a subset of time domain resources of the downlink control channel for scheduling the downlink data channel.

Figure 8:
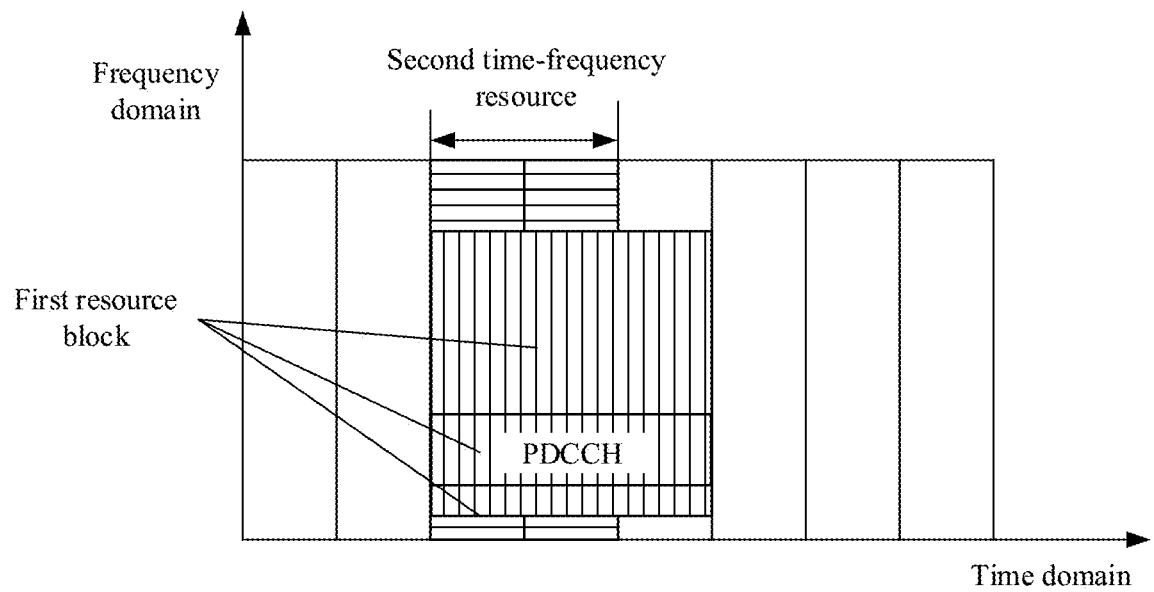
FIG. 8 is a schematic diagram of a time domain resource of a second time-frequency resource and a time domain resource of a PDCCH.
Figure 9:
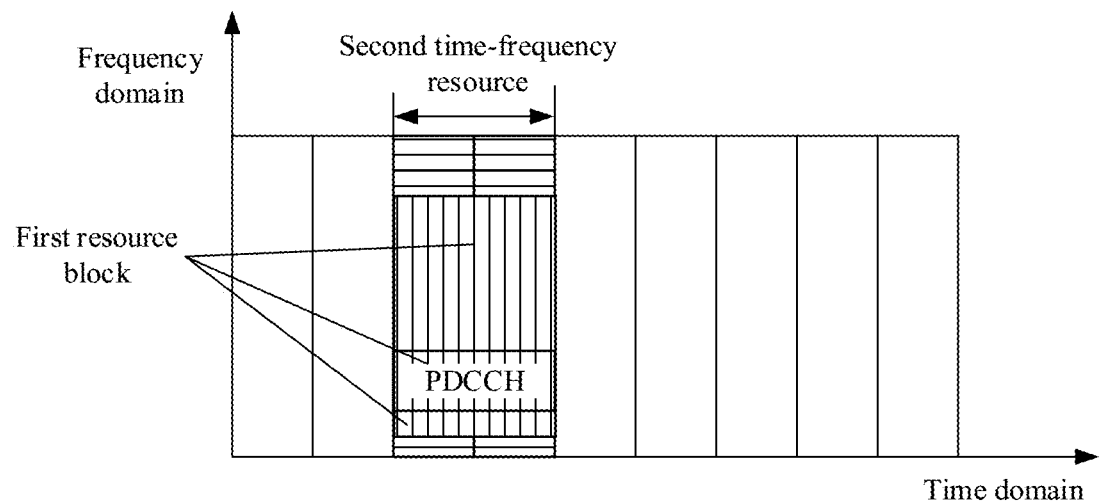
FIG. 9 is a schematic diagram of a time domain resource of a second time-frequency resource and a time domain resource of a PDCCH.

It should be understood that, that time domain resources of the downlink data channel are the subset of the time domain resources of the downlink control channel for scheduling the downlink data channel includes two cases shown in FIG. 8 and FIG. 9.

As shown in FIG. 8, the second time-frequency resource is a shaded area marked with horizontal lines in FIG. 8, and the first resource block is a shaded area marked with vertical lines in FIG. 8. In FIG. 8, a part of the second time-frequency resource is located in the first resource block (the second time-frequency resource and the first resource block occupy a same part of a time-frequency resource). In FIG. 8, the time domain resources of the second time-frequency resource are completely included in the time domain resource of the PDCCH for scheduling the downlink data channel, and a size of the time domain resources of the second time-frequency resource is smaller than a size of the time domain resources of the PDCCH for scheduling the downlink data channel. In other words, the time domain resources of the second time-frequency resource are the subset of the time domain resources of the PDCCH.

As shown in FIG. 9, the second time-frequency resource is a shaded area marked with horizontal lines, the first resource block is a shaded area marked with vertical lines, and the first resource block is completely included in the second time-frequency resource. In FIG. 9, the time domain resources of the second time-frequency resource are exactly the same as the time domain resources of the PDCCH for scheduling the downlink data channel.

Optionally, in an embodiment, none of the above mentioned P resource blocks carries the downlink control channel for scheduling the downlink data channel, and the time domain resources of the downlink data channel are not the subset of the time domain resources of the downlink control channel for scheduling the downlink data channel.

It should be understood that when at least a part of the time domain resources of the downlink data channel does not belong to the time domain resources of the downlink control channel for scheduling the downlink data channel, the time domain resources of the downlink data channel are not the subset of the time domain resources of the downlink control channel for scheduling the downlink data channel.

Figure 10:
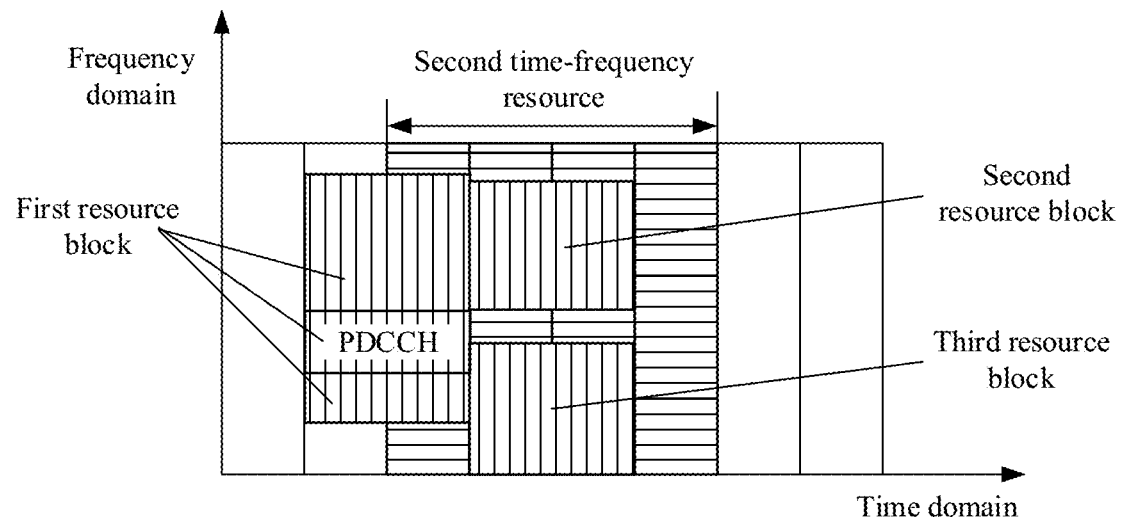
FIG. 10 is a schematic diagram of a second time-frequency resource and a first resource block to a third resource block.

For example, as shown in FIG. 10, the second time-frequency resource is a shaded area that is marked with horizontal lines and that is within four symbols in FIG. 10, and the first resource block, a second resource block, and a third resource block are all areas that are marked with vertical lines (for a specific correspondence, refer to directions of line segments in FIG. 10). The first resource block includes three parts of resources in total, and the three parts of resources are respectively a resource corresponding to the PDCCH and resources above and below the PDCCH. In FIG. 10, the first resource block carries the PDCCH, and an intersection exists between the second time-frequency resource and the time domain resource of the PDCCH for scheduling the downlink data channel (in the case shown in FIG. 10, the time domain resources of the second time-frequency resource are not the subset of the time domain resources of the PDCCH). Neither the second resource block nor the third resource block carries the PDCCH, and both the second resource block and the third resource block can be used to transmit the downlink data channel. Therefore, the time domain position of the first reference signal of the downlink data channel may be located on the second symbol of the second time-frequency resource.

1005: Receive the reference signal.

When the reference signal is received in step 1005, the reference signal may be received based on the position of the reference signal of the downlink data channel determined in step 1004, to accurately receive the reference signal.

Optionally, the reference signal is a demodulation reference signal (DMRS).

In this application, when the first time-frequency resource includes the N resource blocks that have the intersection with the second time-frequency resource, the position of the reference signal of the downlink data channel may be determined based on whether the N1 resource blocks in the rate matching pattern group in the N resource blocks can be used to transmit the downlink data channel, to implement reference signal transmission.

The reference signal receiving method in the embodiments of this application is described in detail above with reference to FIG. 2 to FIG. 8. The following describes a reference signal sending method in the embodiments of this application with reference to FIG. 11. It should be understood that the reference signal receiving method shown in FIG. 2 corresponds to the reference signal sending method shown in FIG. 11.

The foregoing definitions and explanations of related information in the reference signal receiving method are also applicable to the reference signal sending method in this embodiment of this application. To avoid unnecessary repetition, repeated descriptions are appropriately omitted when the reference signal sending method shown in FIG. 11 is described below.

Figure 11:
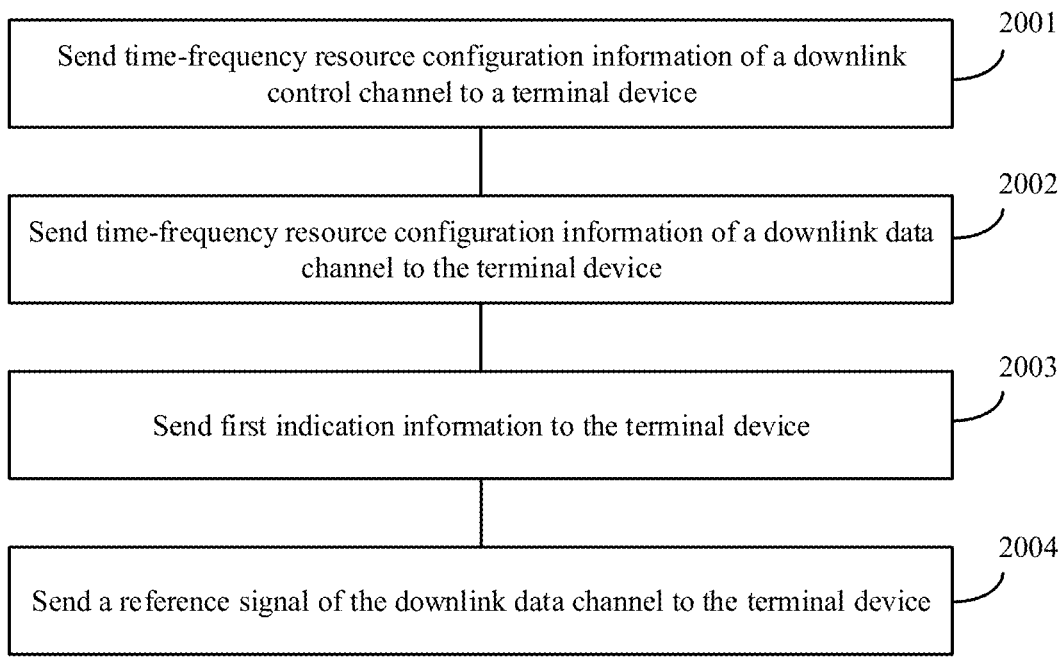
FIG. 11 is a schematic flowchart of a reference signal sending method according to an embodiment of this application.

FIG. 11 is a schematic flowchart of a reference signal sending method according to an embodiment of this application. The method shown in FIG. 11 may be performed by an access network device. The method shown in FIG. 11 includes steps 2001 to 2005, and the following describes these steps.

2001: Send time-frequency resource configuration information of a downlink control channel to a terminal device.

The time-frequency resource configuration information of the downlink control channel indicates a first time-frequency resource, the first time-frequency resource is a time-frequency resource used to transmit the downlink control channel, the first time-frequency resource includes M resource blocks, M is a positive integer, and M may be an infinite positive integer.

The resource blocks may be specifically resources corresponding to a control resource set (CORESET).

2002: Send time-frequency resource configuration information of a downlink data channel to the terminal device.

The time-frequency resource configuration information of the downlink data channel indicates a second time-frequency resource, the second time-frequency resource is a time-frequency resource used to transmit the downlink data channel, an intersection exists between the second time-frequency resource and N resource blocks in the M resource blocks, and N is a positive integer less than M.

Optionally, the second time-frequency resource is a time-frequency resource of a PDSCH configured for the terminal device.

2003: Send first indication information to the terminal device.

The first indication information indicates whether N1 resource blocks in the N resource blocks can be used to transmit the downlink data channel, the N1 resource blocks are resource blocks in a rate matching pattern group in the N resource blocks, and N1 is a positive integer.

Specifically, the first indication information may indicate whether each of the N1 resource blocks can be used to transmit the downlink data channel.

Optionally, a value of a bit of the first indication information is used to indicate whether the N1 resource blocks can be used to transmit the downlink data channel.

2004: Send a reference signal of the downlink data channel to the terminal device.

A position of the reference signal in the second time-frequency resource is determined based on the second time-frequency resource, the N resource blocks, and whether the N1 resource blocks can be used to transmit the downlink data channel.

In this application, when the first time-frequency resource includes the N resource blocks that have the intersection with the second time-frequency resource, the indication information may be sent to the terminal device to indicate whether the N1 resource blocks in the rate matching pattern group in the N resource blocks can be used to transmit the downlink data channel, so that the terminal device can determine the position of the reference signal of the downlink data channel based on the indication information, to implement reference signal transmission.

Figure 12:
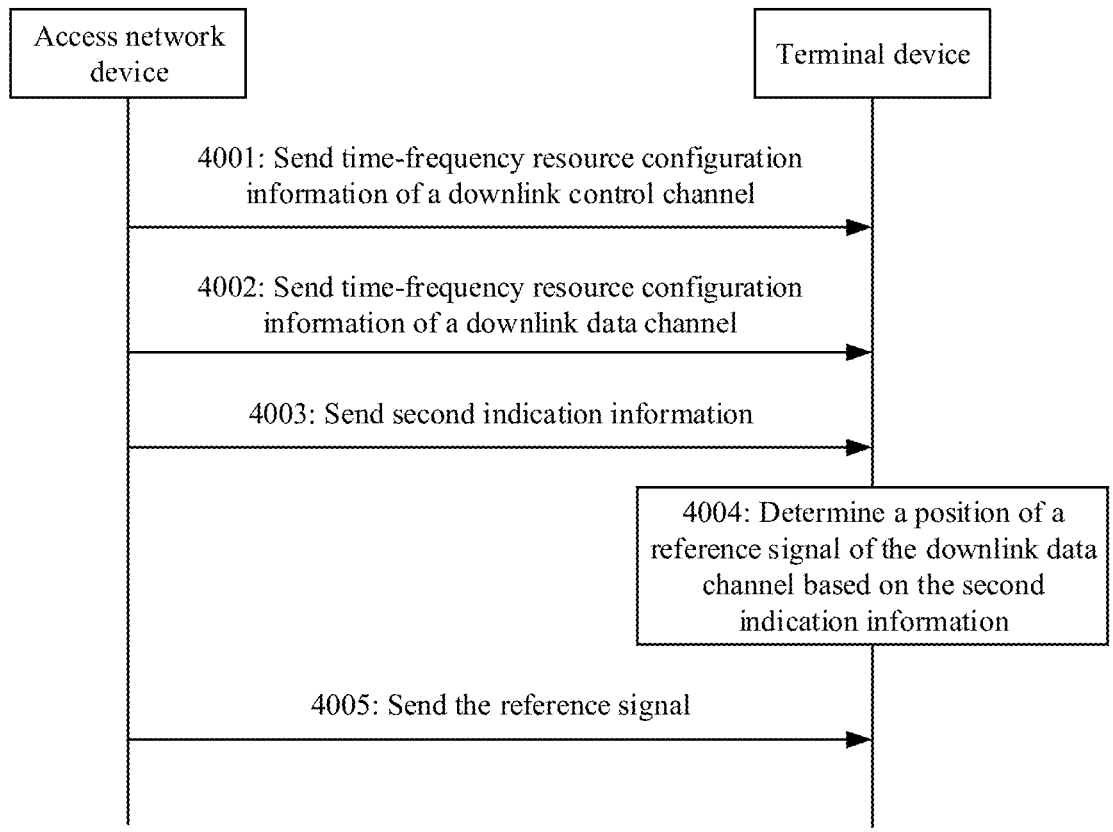
FIG. 12 is a schematic flowchart of a reference signal transmission method according to an embodiment of this application.

The following describes a reference signal transmission method in the embodiments of this application with reference to FIG. 12. The method shown in FIG. 12 includes steps 4001 to 4004, which are described below.

FIG. 12 is a schematic diagram of a reference signal transmission method according to an embodiment of this application. The method shown in FIG. 12 includes the following steps.

4001: An access network device sends time-frequency resource configuration information of a downlink control channel to a terminal device, and the terminal device receives the time-frequency resource configuration information of the downlink control channel.

4002: The access network device sends time-frequency resource configuration information of a downlink data channel to the terminal device, and the terminal device receives the time-frequency resource configuration information of the downlink data channel.

For specific explanations and limitations of the time-frequency resource configuration information of the downlink control channel and the time-frequency resource configuration information of the downlink data channel, refer to related descriptions in the method shown in FIG. 2.

4003: The access network device sends second indication information to the terminal device, and the terminal device receives the second indication information.

The second indication information is used to indicate a time domain position of a reference signal of the downlink data channel in the second time-frequency resource. Further, the second indication information further implicitly indicates whether Q resource blocks that are in N resource blocks and that have an intersection with a time domain resource of the reference signal of the downlink data channel can be used to transmit the downlink data channel.

Optionally, in an embodiment, a value of a bit of the second indication information indicates a position of the first reference signal of the downlink data channel in the second time-frequency resource.

For example, the second indication information includes two bits, and specific cases in which values of the two bits indicate the position of the first reference signal are as follows.

When the two bits of the second indication information are 00, it indicates that a time domain resource of the first reference signal is located on the first symbol in the second time-frequency resource.

When the two bits of the second indication information are 01, it indicates that a time domain resource of the first reference signal is located on the second symbol in the second time-frequency resource.

When the two bits of the second indication information are 10, it indicates that a time domain resource of the first reference signal is located on the third symbol in the second time-frequency resource.

When the two bits of the second indication information are 11, it indicates that a time domain resource of the first reference signal is located on the fourth symbol in the second time-frequency resource.

Further, the second indication information further implicitly indicates that all the Q resource blocks that are in the N resource blocks and that have the intersection with the time domain resource of the reference signal of the downlink data channel can be used to transmit the downlink data channel.

Optionally, in an embodiment, the value of the bit of the second indication information further indicates whether a resource block carrying the downlink control channel for scheduling the downlink data channel can be used to transmit the downlink data channel.

For example, the second indication information includes two bits, and specific cases in which values of the two bits indicate the first reference signal are as follows.

When the two bits of the second indication information are 00, it indicates that the time domain resource of the first reference signal is located on the first symbol in the second time-frequency resource, and the resource block including the PDCCH for scheduling the downlink data channel can be used to transmit the downlink data channel.

When the two bits of the second indication information are 01, it indicates that the time domain resource of the first reference signal is located on the second symbol in the second time-frequency resource, and the resource block including the PDCCH for scheduling the downlink data channel can be used to transmit the downlink data channel.

When the two bits of the second indication information are 10, it indicates that the time domain resource of the first reference signal is located on the third symbol in the second time-frequency resource, and the resource block including the PDCCH for scheduling the downlink data channel cannot be used to transmit the downlink data channel.

When the two bits of the second indication information are 11, it indicates that the time domain resource of the first reference signal is located on the fourth symbol in the second time-frequency resource, and the resource block including the PDCCH for scheduling the downlink data channel can be used to transmit the downlink data channel.

4004: The access network device sends the reference signal of the downlink data channel to the terminal device, and the terminal device receives the reference signal.

In step 4004, the terminal device may receive the reference signal based on the time domain position that is of the reference signal in the second time-frequency resource and that is indicated by the second indication information.

In this application, by using an indication of the second indication information, that all the Q resource blocks that are in the N resource blocks and that have the intersection with the time domain resource of the reference signal of the downlink data channel can be used to transmit the downlink data channel may be further implicitly indicated, so that the terminal device receives, at a corresponding position, the downlink data channel sent by the access network device.

Optionally, in an embodiment, a mapping type of the downlink data channel is a type B.

Before the terminal device receives the reference signal, the terminal device may first determine that the mapping type of the downlink data channel is the type B; and then terminal device receives, based on the position of the reference signal determined by using the second indication information, the reference signal sent by the access network device.

The foregoing describes in detail the communication method in the embodiments of this application with reference to FIG. 1 to FIG. 12. The following describes communications apparatuses in the embodiments of this application with reference to FIG. 13 to FIG. 16.

Figure 13:
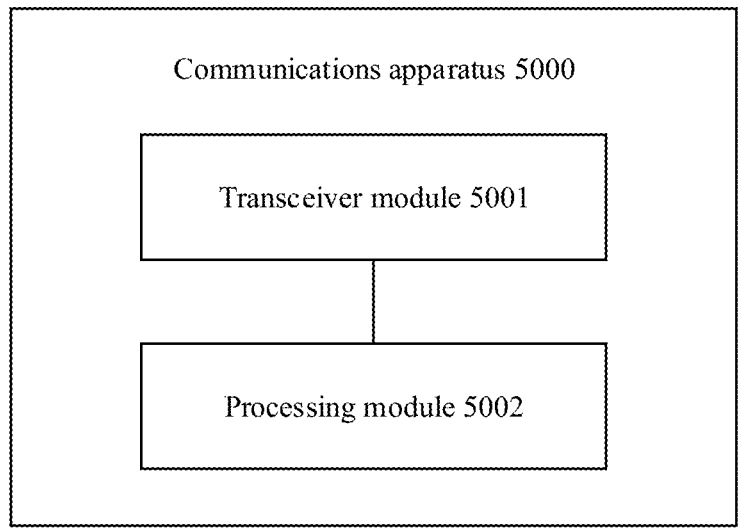
FIG. 13 is a schematic block diagram of a terminal device according to an embodiment of this application.

FIG. 13 is a schematic block diagram of a communications apparatus according to an embodiment of this application. As shown in FIG. 13, the communications apparatus 5000 includes:

a transceiver module 5001, where the transceiver module 5001 is configured to:

receive time-frequency resource configuration information of a downlink control channel from an access network device;

receive time-frequency resource configuration information of a downlink data channel from the access network device; and receive first indication information from the access network device; and a processing module 5002, configured to determine, based on a second time-frequency resource, N resource blocks, and the first indication information, a position of a reference signal of the downlink data channel in the second time-frequency resource, where the transceiver module 5001 is further configured to receive the reference signal.

It should be understood that, for definitions and explanations of the time-frequency resource configuration information of the downlink control channel, the time-frequency resource configuration information of the downlink data channel, and the first indication information that are received by the transceiver module 5001, refer to related descriptions in the method shown in FIG. 2.

In this application, when a first time-frequency resource includes the N resource blocks that have the intersection with the second time-frequency resource, the position of the reference signal of the downlink data channel may be determined based on whether N1 resource blocks in a rate matching pattern group in the N resource blocks can be used to transmit the downlink data channel, to implement reference signal transmission.

Optionally, in an embodiment, the processing module 5002 is configured to determine, based on whether the N1 resource blocks can be used to transmit the downlink data channel, that a time domain position of the first reference signal of the downlink data channel is located on an $i^{th}$ symbol of the second time-frequency resource, where i is a positive integer.

It should be understood that, for a specific process in which the processing module 5002 determines that the time domain position of the first reference signal is located on the $i^{th}$ symbol of the second time-frequency resource, refer to related descriptions of step 1002 in the method shown in FIG. 2.

Optionally, in an embodiment, the processing module 5002 is further configured to determine a mapping type of the downlink data channel is a type B.

Figure 14:
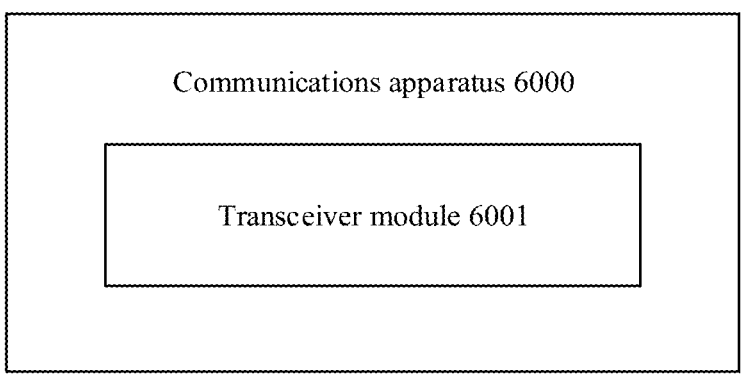
FIG. 14 is a schematic block diagram of an access network device according to an embodiment of this application.

FIG. 14 is a schematic block diagram of a communications apparatus according to an embodiment of this application. As shown in FIG. 14, the communications apparatus 6000 includes:

a transceiver module 6001, where the transceiver module 6001 is configured to:

send time-frequency resource configuration information of a downlink control channel to a terminal device;

send time-frequency resource configuration information of a downlink data channel to the terminal device;

send first indication information to the terminal device; and send a reference signal of the downlink data channel to the terminal device.

For definitions and explanations of the time-frequency resource configuration information of the downlink control channel, the time-frequency resource configuration information of the downlink data channel, and the first indication information that are sent by the transceiver module 6001, refer to related descriptions in the method shown in FIG. 2.

Figure 15:
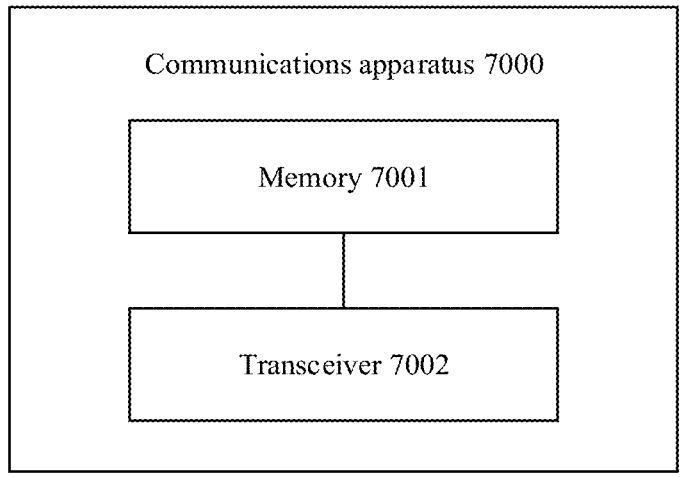
FIG. 15 is a schematic block diagram of a terminal device according to an embodiment of this application.
Figure 15:
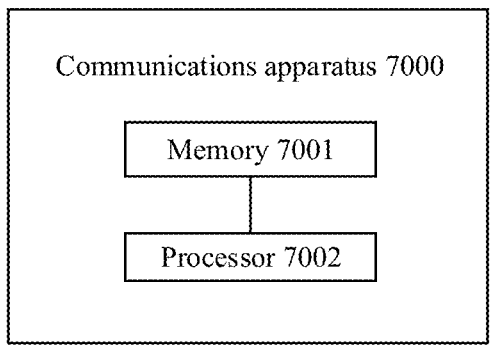

FIG. 15 is a schematic block diagram of a communications apparatus according to an embodiment of this application. As shown in FIG. 15, the communications apparatus 7000 includes:

a memory 7001, configured to store a program; and a processor 7002, configured to execute the program stored in the memory 7001, where when the program stored in the memory 7001 is executed, the processor 7002 and a transceiver are configured to perform the steps in the method shown in FIG. 2.

Specifically, the transceiver may be configured to perform steps 1001 to 1003 and step 1005, and the processor 7002 is configured to perform step 1004.

Figure 16:
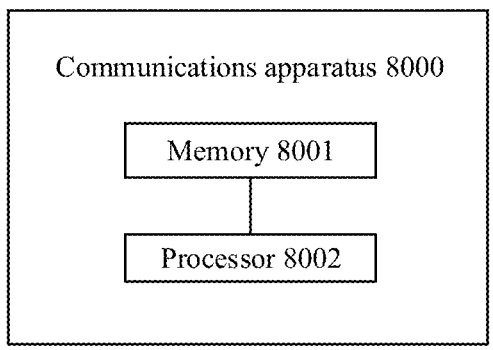
FIG. 16 is a schematic block diagram of an access network device according to an embodiment of this application.

FIG. 16 is a schematic block diagram of a communications apparatus according to an embodiment of this application. As shown in FIG. 16, the communications apparatus 8000 includes:

a memory 8001, configured to store a program; and a processor 8002, configured to execute a program stored in a memory 8001, where when the program stored in the memory 8001 is executed, a processor 8002 is configured control a transceiver to perform the steps in the method shown in FIG. 11.

The communications apparatus in FIG. 13 and FIG. 15 may be a terminal device, or may be a chip or a function module used in the terminal device.

The communications apparatus in FIG. 14 and FIG. 16 may be an access network device, or may be a chip or a function module used in the access network device.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. In the text descriptions of this application, the character "/" usually indicates an "or" relationship between the associated objects. In a formula in this application, the character "/" indicates a "division" relationship between the associated objects.

It may be understood that various numbers in the embodiments of this application are merely used for differentiation for ease of description, and are not used to limit the scope of the embodiments of this application. Sequence numbers of the foregoing processes do not mean execution sequences. The execution sequences of the processes should be determined based on functions and internal logic of the processes.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and there may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving time-frequency resource configuration information of a downlink control channel from an access network device, wherein the time-frequency resource configuration information of the downlink control channel indicates a first time-frequency resource, the first time-frequency resource is used to transmit the downlink control channel, the first time-frequency resource comprises M resource blocks, and M is a positive integer;

receiving time-frequency resource configuration information of a downlink data channel from the access network device, wherein the time-frequency resource configuration information of the downlink data channel indicates a second time-frequency resource, the second time-frequency resource is used to transmit the downlink data channel, an intersection exists between the second time-frequency resource and N resource blocks in the M resource blocks, and N is a positive integer less than M;

receiving first indication information from the access network device, wherein the first indication information indicates whether N1 resource blocks in the N resource blocks can are to be used to transmit the downlink data channel, the N1 resource blocks are resource blocks in a rate matching pattern group in the N resource blocks, and N1 is a positive integer;

determining, based on the second time-frequency resource, the N resource blocks, and the first indication information, a position of a reference signal of the downlink data channel in the second time-frequency resource; and receiving the reference signal.

2. The method according to claim 1, wherein the determining, based on the second time-frequency resource, the N resource blocks, and the first indication information, the position of the reference signal of the downlink data channel in the second time-frequency resource comprises:

determining, based on whether the N1 resource blocks can be used to transmit the downlink data channel, that a time domain position of the reference signal of the downlink data channel is located on an $i^{th}$ symbol of the second time-frequency resource, wherein i is a positive integer;

the $i^{th}$ symbol is a symbol with a smallest sequence number in at least one of a first-type symbol or a second-type symbol;

the first-type symbol is in the second time-frequency resource, all of a set of P resource blocks that are in the N1 resource blocks and that have the intersection in the second time-frequency resource with the first-type symbol are to be used to transmit the downlink data channel, there is no intersection in the second time-frequency resource between the first-type symbol and any one of N2 resource blocks, P is a positive integer less than or equal to N1, and the N2 resource blocks are resource blocks other than the N1 resource blocks in the N resource blocks; and the second-type symbol is in the second time-frequency resource and has no intersection with any of the N resource blocks.

3. The method according to claim 1, wherein time domain resources of the downlink data channel are a subset of time domain resources of the downlink control channel for scheduling the downlink data channel.

4. The method according to claim 2, wherein none of the P resource blocks carries the downlink control channel for scheduling the downlink data channel, and time domain resources of the downlink data channel are not a subset of time domain resources of the downlink control channel for scheduling the downlink data channel.

5. The method according to claim 1, wherein a mapping type of the downlink data channel is a type B.

6. An apparatus comprising:
one or more processors; and
a non-transitory computer readable medium storing a program to be executed by the one or more processors, the program comprises instructions for:
receiving time-frequency resource configuration information of a downlink control channel from an access network device, wherein the time-frequency resource configuration information of the downlink control channel indicates a first time-frequency resource, the first time-frequency resource is used to transmit the downlink control channel, the first time-frequency resource comprises M resource blocks, and M is a positive integer;

receiving time-frequency resource configuration information of a downlink data channel from the access network device, wherein the time-frequency resource configuration information of the downlink data channel indicates a second time-frequency resource, the second time-frequency resource is used to transmit the downlink data channel, an intersection exists between the second time-frequency resource and N resource blocks in the M resource blocks, and N is a positive integer less than M;

receiving first indication information from the access network device, wherein the first indication information indicates whether N1 resource blocks in the N resource blocks can are to be used to transmit the downlink data channel, the N1 resource blocks are resource blocks in a rate matching pattern group in the N resource blocks, and N1 is a positive integer;

determining, based on the second time-frequency resource, the N resource blocks, and the first indication information, a position of a reference signal of the downlink data channel in the second time-frequency resource; and receiving the reference signal.

7. The apparatus according to claim 6, wherein the program further comprises instructions for:

determining, based on whether the N1 resource blocks can be used to transmit the downlink data channel, that a time domain position of the first reference signal of the downlink data channel is located on an $i^{th}$ symbol of the second time-frequency resource, wherein i is a positive integer;

the $i^{th}$ symbol is a symbol with a smallest sequence number in at least one of a first-type symbol or a second-type symbol;

the first-type symbol is in the second time-frequency resource, all of a set of P resource blocks that are in the N1 resource blocks and that have the intersection in the second time-frequency resource with the first-type symbol are to be used to transmit the downlink data channel, there is no intersection in the second time-frequency resource between the first-type symbol and any one of N2 resource blocks, P is a positive integer less than or equal to N1, and the N2 resource blocks are resource blocks other than the N1 resource blocks in the N resource blocks; and the second-type symbol is in the second time-frequency resource and has no intersection with any of the N resource blocks.

8. The apparatus according to claim 6, wherein time domain resources of the downlink data channel are a subset of time domain resources of the downlink control channel for scheduling the downlink data channel.

9. The apparatus according to claim 7, wherein none of the P resource blocks carries the downlink control channel for scheduling the downlink data channel, and time domain resources of the downlink data channel are not a subset of time domain resources of the downlink control channel for scheduling the downlink data channel.

10. The apparatus according to claim 6, wherein a mapping type of the downlink data channel is a type B.

11. An apparatus comprising:
one or more processors; and
a non-transitory computer readable medium storing a program to be executed by the one or more processors, the program comprises instructions for:
sending time-frequency resource configuration information of a downlink control channel to a terminal device, wherein the time-frequency resource configuration information of the downlink control channel indicates a first time-frequency resource, the first time-frequency resource is used to transmit the downlink control channel, the first time-frequency resource comprises M resource blocks, and M is a positive integer;
sending time-frequency resource configuration information of a downlink data channel to the terminal device, wherein the time-frequency resource configuration information of the downlink data channel indicates a second time-frequency resource, the second time-frequency resource is used to transmit the downlink data channel, an intersection exists between the second time-frequency resource and N resource blocks in the M resource blocks, and N is a positive integer less than M;
sending first indication information to the terminal device, wherein the first indication information indicates whether N1 resource blocks in the N resource blocks are to be used to transmit the downlink data channel, the N1 resource blocks are resource blocks in a rate matching pattern group in the N resource blocks, and N1 is a positive integer; and
sending a reference signal of the downlink data channel to the terminal device, wherein a position of the reference signal in the second time-frequency resource is determined based on the second time-frequency resource, the N resource blocks, and whether the N1 resource blocks can be used to transmit the downlink data channel.

12. The apparatus according to claim 11, wherein a time domain position of the reference signal of the downlink data channel is located on an $i^{th}$ symbol of the second time-frequency resource, wherein i is a positive integer;
the $i^{th}$ symbol is a symbol with a smallest sequence number in at least one of a first-type symbol the or a second-type symbol;
the first-type symbol is in the second time-frequency resource, all of a set of P resource blocks that are in the N1 resource blocks and that have the intersection in the second time-frequency resource with the first-type symbol are to be used to transmit the downlink data channel, there is no intersection in the second time-frequency resource between the first-type symbol and any one of N2 resource blocks, P is a positive integer less than or equal to N1, and the N2 resource blocks are resource blocks other than the N1 resource blocks in the N resource blocks; and
the second-type symbol is in the second time-frequency resource and has no intersection with any of the N resource blocks.

13. The apparatus according to claim 11, wherein time domain resources of the downlink data channel are a subset of time domain resources of the downlink control channel for scheduling the downlink data channel.

14. The apparatus according to claim 12, wherein none of the P resource blocks carries the downlink control channel for scheduling the downlink data channel, and time domain resources of the downlink data channel are not a subset of time domain resources of the downlink control channel for scheduling the downlink data channel.

15. The apparatus according to claim 11, wherein a mapping type of the downlink data channel is a type B.

* * * * *